(12) United States Patent
Van Patten

(10) Patent No.: US 10,556,578 B1
(45) Date of Patent: Feb. 11, 2020

(54) ALARMING DEVICE FOR A PARKING BRAKE OF A VEHICLE

(71) Applicant: Jeff Van Patten, Villa Park, IL (US)

(72) Inventor: Jeff Van Patten, Villa Park, IL (US)

( * ) Notice: Subject to any disclaimer, the term of this patent is extended or adjusted under 35 U.S.C. 154(b) by 0 days.

(21) Appl. No.: 16/210,127

(22) Filed: Dec. 5, 2018

(51) Int. Cl.
*B60T 17/22* (2006.01)
*G08B 21/18* (2006.01)

(52) U.S. Cl.
CPC ............ *B60T 17/221* (2013.01); *G08B 21/18* (2013.01)

(58) Field of Classification Search
CPC ....... B60Q 9/002; B60T 17/22; B60T 17/221; G08B 21/24; G08B 21/18
USPC ..................................... 340/457.3, 453, 457
See application file for complete search history.

(56) References Cited

U.S. PATENT DOCUMENTS

| | | | | |
|---|---|---|---|---|
| 4,855,709 A * | 8/1989 | Naderi | ................ | B60R 16/0232 340/438 |
| 4,967,182 A * | 10/1990 | Foster | .................... | B60Q 9/001 200/81 H |
| 5,121,112 A * | 6/1992 | Nakadozono | ............. | B60L 3/12 307/10.1 |
| 5,394,137 A | 2/1995 | Orschek | | |
| 5,760,684 A * | 6/1998 | Orbach | ................... | B60R 22/48 180/268 |
| 6,166,631 A * | 12/2000 | Kennedy | .................. | B60Q 9/00 340/439 |
| 2003/0006644 A1* | 1/2003 | MacGregor | ............... | B60T 7/10 303/3 |
| 2008/0224841 A1* | 9/2008 | Lundgren | ............... | B60T 17/22 340/453 |
| 2015/0248831 A1 | 9/2015 | Cavaliere et al. | | |
| 2016/0129999 A1* | 5/2016 | Mays | .................... | B64C 39/024 701/2 |

FOREIGN PATENT DOCUMENTS

JP       2012236485 A  * 12/2012

* cited by examiner

*Primary Examiner* — Eric Blount
(74) *Attorney, Agent, or Firm* — Sanchelima & Associates, P.A.; Christian Sanchelima; Jesus Sanchelima

(57) ABSTRACT

The present invention is an alarming device for a vehicle that alerts drivers in the event the ignition is switched off and/or the seatbelt is unlocked and the parking brake is in release mode. The alarming device includes an ignition system, a parking brake, a seatbelt assembly, at least one sensor and at least one alert device. The ignition system is manipulable in a switch-ON state and a switch-OFF state. The Parking brake is manipulable in a brake mode and a release mode. The sensor is connected with and senses the ignition system, parking brake and/or seatbelt assembly. Alert device is signaled to be activated by sensor when ignition is being switched to switch-OFF state and/or seatbelt is disconnected from seatbelt lock and the parking brake is in release mode. Alert device notifies by a sound indication and/or a light indication.

11 Claims, 2 Drawing Sheets

ALARMING DEVICE FOR A PARKING BRAKE OF A VEHICLE

BACKGROUND OF THE INVENTION

1. Field of the Invention

The present disclosure relates to vehicles. More particularly, the present disclosure relates to an alarming device for a parking brake of a vehicle.

2. Description of the Related Art

Ideally, parking brakes are required to be applied before switching-off ignitions of vehicles. However, a number of drivers first switch-off the ignition and then apply parking brakes. Occasions occur when drivers' switch-off ignitions but forget to apply parking brakes, which can cause fatal accidents. Hence, there is a need of an alarming device for a parking brake of a vehicle.

Several designs for various alarming devices for vehicles have been designed in the past. None of them, however, includes an alarming device for a parking brake of a vehicle that alarms drivers to apply the parking brake.

Applicant believes that a related reference corresponds to a US patent application 20150248831 filed by MCCAV AIR BRAKE WARNING SYSTEM LLC for a parking brake warning system for air brakes. The MACCAV reference discloses a warning module in connection with a low pressure switch and a door jamb switch to provide an alert if the driver fails to apply the parking brake and opens the vehicle door. However, the system is complex and alerts when the driver is opening the door to step out of vehicle. If the action of stepping out is quick, the driver may miss hearing the alarm.

Another related application is U.S. Pat. No. 5,394,137 by General Electric Company for a vehicle parking brake detection and warning system. The patent '137 discloses a computer based parking brake detection and warning system and method includes pressure sensors for sensing a pressure in a parking brake line to detect that a parking brake has been activated. However, the system requires a computer and hence is cost intensive.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an alarming device for a parking brake of a vehicle that alerts drivers in the event the ignition is switched off and/or seat belt is unlocked and parking brake is in a release mode.

It is yet another object of the present invention to provide an alarming device for a parking brake of a vehicle that alarms a driver to activate parking brake and prevent occurrence of undesirable accidents.

It is still another object of the present invention to provide an alarming device that alarms visually and/or is audible.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
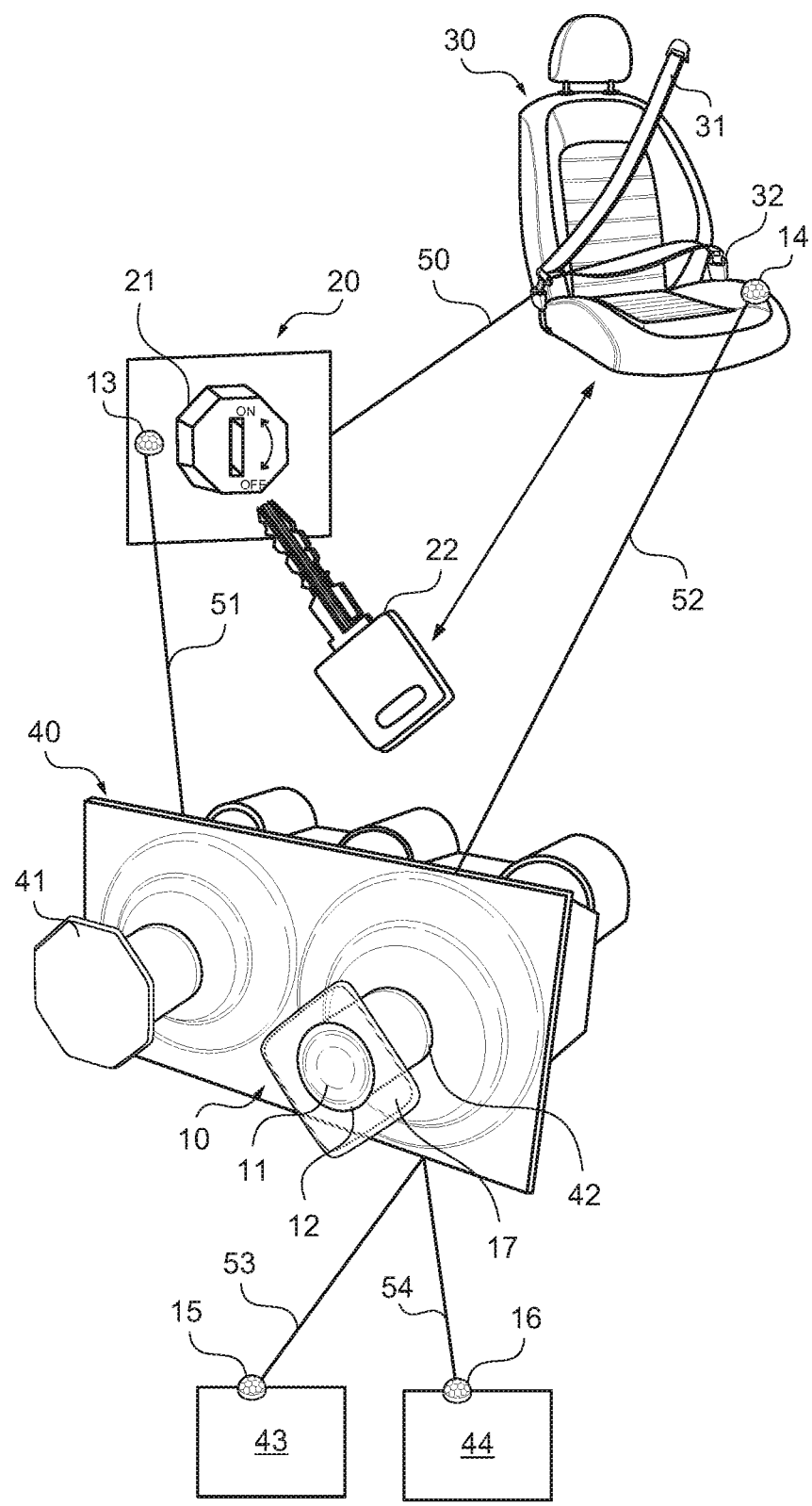
FIG. 1 represents a schematic representation of an alarming device 10, in accordance with one embodiment of the present disclosure, in operative environment that is communicable with at least one parking brake 40, an ignition system 20 and/or a seat belt assembly 30.
Figure 2:
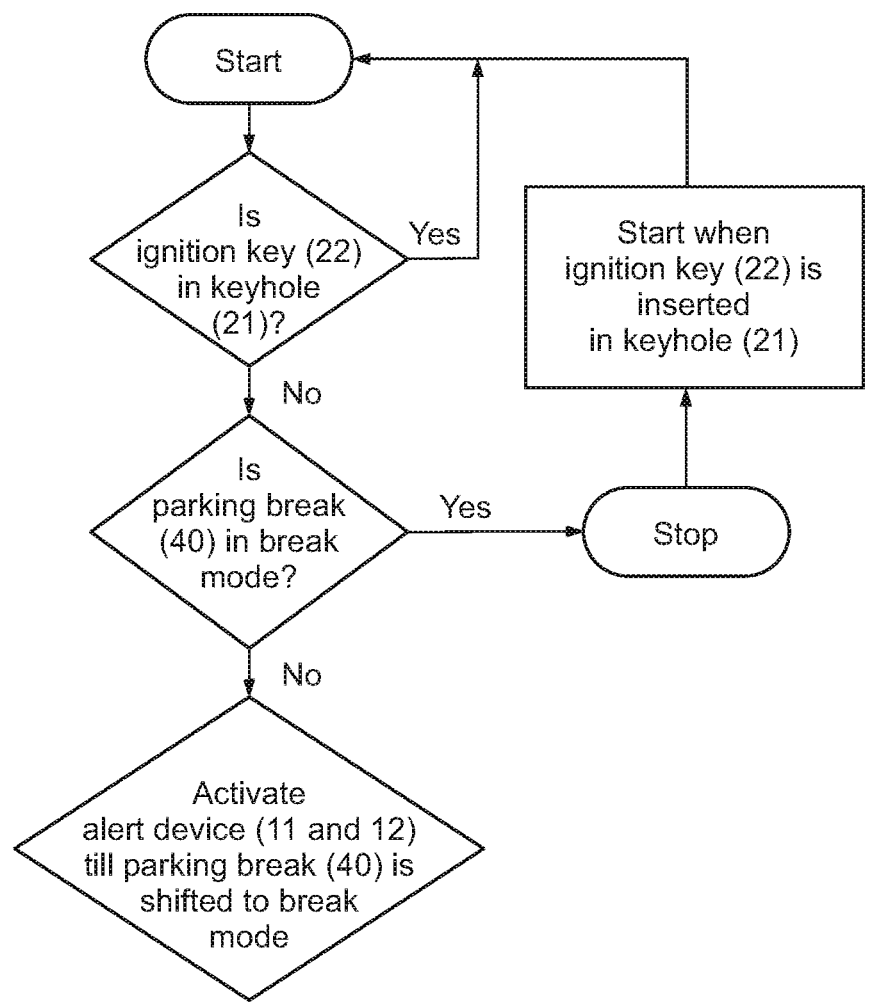
FIG. 2 represents a flowchart of activation and deactivation of alarming device 10.

Referring now to the drawings, FIGS. 1-2, where the present invention is generally referred to with numeral 10, it can be observed that an alarming device, in accordance with one embodiment, is provided for a vehicle (not illustrated in Figures) that mainly includes an ignition system 20, a seat belt assembly 30, a parking brake 40, at least one alert device 11 and 12 and at least one sensor 13.

Ignition system 20 mainly includes a key hole 21 and an ignition key 22. When ignition key 22 is removed from key hole 21 ignition is stopped. With the help of ignition key 22, ignition system 20 is manipulated to a switch-ON state and a switch-OFF state.

Parking brake 40 is manipulated to achieve a brake mode and a release mode. Parking brake 40 includes a knob and a brake mechanism. In one embodiment, parking brake 40 is provided for a trailer that includes a brake mechanism 43 operated by knob 41. Additionally, parking brake 40 is provided for a tractor that includes a brake mechanism 44 operated by knob 42.

Seatbelt assembly 30 includes a seatbelt 31 and a seatbelt lock 32. Seatbelt 31 is inserted into seatbelt lock 32 while a driver is ready for a drive and removed by unlocking seatbelt lock 32, which releases seatbelt 31 while driver has reached the destination.

In one embodiment, seatbelt assembly 30 is optionally connected with alarming device 10. Seatbelt assembly 30 is directly communicable with alarming device 10 or is communicable first with ignition system 20 and the combined result of seatbelt assembly 30 and ignition system 20 is communicated to alarming device 10. Seatbelt assembly 30 can be connected to ignition system 20 by wire connection 50 or can be connected wirelessly.

Sensors 13 to 16 are provided that senses each of ignition system 20, parking brake 40 and seatbelt assembly 30. Sensor 13 is positioned to sense whether ignition system 20 is in switch-ON state or switch-OFF state. Sensor 13 communicates sensed information to alarming device 10 by wire 51 or by wireless communication. Sensor 14 senses whether seatbelt 31 is locked or un-locked with seatbelt lock 32. Sensor 14 communicates sensed information to alarming device 10 by wire 52 or by wireless communication. Sensor 15 senses whether brake mechanism 43 of trailer is in brake mode or release mode. Sensor 15 communicates sensed information to alarming device 10 by wire 53 or by wireless communication. Sensor 16 senses whether brake mechanism 44 of tractor is in brake mode or release mode. Sensor 16 communicates sensed information to alarming device 10 by wire 54 or by wireless communication.

Alert device are provided that can alert by light indication 11 and by sound indication 12. Either one of light indication 11 or sound indication 12 can be provided or both light indication 11 and sound indication 12 can be provided. Apart from light indication 11 and sound indication 12, other indicators such as vibrations, displaying messages on a display screen (not illustrated in Figures) or other like alarming indicators are within the scope of the present disclosure. Also, indicators can be a single indicator or can be a number of combinations of indicators. As illustrated, alert device is fitted on knob 42 and covered by a transparent screen that can allow passage of light from the light indicator 11.

In operation, the alarming device 10 is activated when ignition system 20 is switched into switch-ON state. In event when seatbelt system 30 is used, alarming device 10 is activated when both or one of ignition system 20 and seatbelt system 30 is in active state i.e. ignition system 20 is switched into switch-ON state and/or seatbelt 31 is locked with seatbelt lock 32. Once activated, one or both sensor(s) 13 and/or 14 continuously senses respective ignition system 20 and seatbelt system 30 and in event when ignition system 20 is sensed to be in switch-OFF state and/or seatbelt 31 is sensed to un-locked from seatbelt lock 32, sensor(s) 13 and/or 14 signals to check whether parking brake 40 is in brake mode or release mode. In event when it is detected that parking brake 40 is in brake mode then alarming device 10 is switched-off. In event when it is detected that parking brake 40 is in release mode then at least one alert device 11 or 12 of alarming device 10 is activated to alert driver to switch parking brake 40 in release mode.

As the alert is connected with ignition system 20 and/or seatbelt assembly 30, driver well before receives the alert and hence alarming device 10 of the present disclosure is more useful as compared to prior arts to prevent occurrences of fatal accidents.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An alarming device for a vehicle, said device comprising:
   An ignition system manipulable in a switch-ON state and a switch-OFF state, said ignition system including a key hole and an ignition key, wherein said ignition system is in said switch-OFF state when said ignition key is removed from said key hole, wherein said ignition system is in said switch-ON state when said ignition key is mounted within said key hole, wherein said ignition system is an existing ignition system in a vehicle, wherein said ignition system additionally includes a sensor thereon configured to sense if said ignition system is in said switch-ON state or said switch-OFF state, wherein said vehicle is a tractor; and
   A parking brake manipulable in a brake mode and a release mode, wherein said parking brake is an air brake system, said parking brake having a rectangular frame and includes a first knob and a second knob and further includes a first locking mechanism and a second locking mechanism, wherein said first locking mechanism and said second locking mechanism include a sensor thereon, wherein said sensor is connected to a brake system of said vehicle, wherein said first knob and said second knob are mounted adjacently next to each other on said rectangular frame, wherein said first knob includes a cylindrical body protruding perpendicularly from a center portion on a left side of said rectangular frame, wherein said first knob further includes a first knob member mounted to a protruding end of said cylindrical body, wherein said first knob member is hexagonal in shape and extends beyond the diameter of said cylindrical body, wherein said second knob includes a cylindrical body protruding perpendicularly from a center portion on a right side of said rectangular frame, wherein said second knob further includes a second knob member mounted to a protruding end of said cylindrical body, wherein said second knob member has a diamond shape, wherein said parking brake further includes alert devices to be activated when said ignition system is in said switch-OFF state and said parking brake being in said release mode or if said seatbelt is disengaged without activating said parking brake, wherein said parking brake is communicably mounted with said ignition system and to a locking mechanism for a seatbelt of said vehicle, wherein said seatbelt remains in a locked position upon said ignition system being in the switch-OFF state and the parking brake is in the release mode.

2. The device as claimed in claim 1, wherein said sensor is wirelessly connected with at least one of said ignition system and said parking brake.

3. The device as claimed in claim 1, wherein said sensor is connected with at least one wire to at least one of said ignition system and said parking brake.

4. The device as claimed in claim 1, wherein said alert device is a light indicator.

5. The device as claimed in claim 1, wherein said alert device is a sound indicator.

6. The device as claimed in claim 1, wherein said sensor senses a seatbelt assembly and signals activation of said alert device in event when said seatbelt is disconnected from seatbelt lock and said parking brake is in release mode.

7. An alarming device for a vehicle, said device comprising:
   An ignition system manipulable in a switch-ON state and a switch-OFF state, said ignition system including a key hole and an ignition key, wherein said ignition system is in said switch-OFF state when said ignition key is removed from said key hole, wherein said ignition system is in said switch-ON state when said ignition key is mounted within said key hole, wherein said ignition system is an existing ignition system in a vehicle, wherein said ignition system additionally includes a sensor thereon configured to sense if said ignition system is in said switch-ON state or said switch-OFF state, wherein said vehicle is a tractor;
   A parking brake manipulable in a brake mode and a release mode, wherein said parking brake is an air brake system, said parking brake having a rectangular frame and includes a first knob and a second knob and further includes a first locking mechanism and a second locking mechanism, wherein said first locking mechanism and said second locking mechanism include a sensor thereon; and
   A seat belt assembly defined with a seatbelt and a seatbelt lock;
   Characterized in that:
   a sensor connected with said ignition system and said parking brake; and
   At least one alert device activated by said sensor in event when at least one of:
   Said ignition being switched to switch-OFF state and said parking brake being in release mode; and/or
   Said seatbelt disconnected from said seatbelt lock and said parking brake being in release mode.

8. The device as claimed in claim 7, wherein said sensor is wirelessly connected with at least one of said ignition system, said parking brake and said seatbelt assembly.

9. The device as claimed in claim 1, wherein said sensor is connected with at least one wire to at least one of said ignition system, said parking brake and seatbelt assembly.

10. The device as claimed in claim 1, wherein said alert device is a light indicator.

11. The device as claimed in claim 1, wherein said alert device is a sound indicator.

* * * * *